United States Patent [19]

Dozier et al.

[11] Patent Number: 4,809,171
[45] Date of Patent: Feb. 28, 1989

[54] CONCURRENT PROCESSING OF DATA OPERANDS

[75] Inventors: Harold W. Dozier, Carrollton; Thomas M. Jones, Dallas; Steven J. Wallach, Dallas; Jeffrey H. Gruger, Dallas, all of Tex.

[73] Assignee: Convex Computer Corporation, Richardson, Tex.

[21] Appl. No.: 147,112

[22] Filed: Jan. 21, 1988

Related U.S. Application Data

[63] Continuation of Ser. No. 622,449, Jun. 20, 1984, abandoned.

[51] Int. Cl.$^4$ .............................................. G06F 9/38
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,970,993 | 7/1976 | Finnila | 364/200 |
| 4,050,058 | 9/1977 | Garlic | 364/200 |
| 4,128,880 | 12/1978 | Cray, Jr. | 364/200 |
| 4,435,765 | 3/1984 | Uchida et al. | 364/200 |
| 4,468,736 | 8/1984 | DeSantis et al. | 364/200 |
| 4,491,932 | 1/1985 | Ruhman et al. | 364/900 |
| 4,507,728 | 3/1985 | Sakamoto et al. | 364/200 |
| 4,525,796 | 6/1985 | Omoda et al. | 364/730 |
| 4,594,682 | 6/1986 | Drimak | 364/900 |

OTHER PUBLICATIONS

Nissen, S. M. & Wallach, S. J., "The All Applications Digital Computer", ACM-IEEE Symposium on High--Level-Language Computer Architecture, Nov. 7 and 8, 1973.

Kogge, P. M., The Architecture of Pipelined Computers, 1981, Chaps, 2, 4 and 6.

Lorin, H., Parallelism in Hardware and Software: Real and Apparent Concurrency 1972, Chap. 8.

*Primary Examiner*—Gary V. Harkcom
*Assistant Examiner*—Randy W. Lacasse
*Attorney, Agent, or Firm*—Richards, Harris, Medlock & Andrews

[57] ABSTRACT

An operand processing unit (10) carries out processing of operands in a computer. The unit (10) includes a plurality of operation circuits (12, 14, 16, 18, 20). A source bus (22) provides one operand per clock cycle to the operation circuits (12, 14, 16, 18, 20). A destination bus (24) receives one resultant per clock cycle from the operation circuits (12, 14, 16, 18, 20). Within each operation circuit there is provided an operand processing circuit (80) which performs a selected function with the received operands. These functions include, for example, multiplication, division, addition, subtraction, logical AND, and shift. Logical circuitry provides a priority assignment to the operation circuits (12, 14, 16, 18, 20) for sequencing the loading of operands into the highest priority operation circuit (12, 14, 16, 18, 20) which is not busy processing operands within its corresponding operand processing circuit (80). The operand processing unit (10) provides concurrent processing of operands to enhance processing speed. The operands and resultants are handled in a manner such that there is a uniform and sequential flow of operands from a source, such as main memory, and a uniform and sequential delivery of resultants to a destination, such as a memory or input/output device.

29 Claims, 2 Drawing Sheets

CONCURRENT PROCESSING OF DATA OPERANDS

This application is a continuation of application Ser. No. 622,449, filed June 20, 1984, now abandoned.

TECHNICAL FIELD

The present invention pertains to computer technology and in particular to the concurrent processing of data operands for enhanced processing speed.

BACKGROUND OF THE INVENTION

A continuing design objective in computer technology is to increase the rate of operand processing. A general technique for increasing operand processing is the use of multiple arithmetic logic units (ALU) operating in parallel. Parallel operation may be particularly suitable in applications which utilize data vectors. Such vectors comprise a plurality of elements which are subject to the same functional processing. Although parallel processing of vector elements is an appealing concept, there are many problems encountered in attempting to implement the concept in a computer. Functional processing units typically operate upon data elements which are stored in a main memory and transferred through input/output devices. There can be considerable difficulty encountered in synchronizing the operation of a plurality of ALUs and coordinating the ALU operation with the input and output of data elements. It is difficult to fully utilize a group of parallel logic units to achieve the full capability of all of the units.

In using parallel processing units, a system is typically subject to a catastrophic failure if there is a failure of any one of the processing units.

Examples of parallel processing are shown in U.S. Pat. No. 4,128,880 to Cray, Jr. and in the book *Parallelism in Hardware and Software: Real and Apparent Concurrency*, Harold Lorin, Prentice-Hall, Inc., copyright 1972.

In view of the potential value of parallel processing to achieve increased operand processing rates, there exists a need for a method and apparatus to optimally control the input and output of operands to parallel processing units, to allocate the logic units for maximum utilization while eliminating the difficulties of synchronization with other computer units as well as synchronization between the parallel processing units. There is further a need to eliminate the possibility of a system failure as a result of a failure of only one of a plurality of parallel processing units.

SUMMARY OF THE INVENTION

A selected embodiment of the present invention comprises a method for concurrent processing of data operands in a computer wherein instructions for processing the operands require a plurality of computer clock cycles for execution. One operand per clock cycle is transferred through an input bus during each of a plurality of sequential clock cycles. A plurality of operands are loaded at the rate of one operand per clock cycle into a plurality of operand processing circuits during a plurality of sequential clock cycles. The operands are processed within the operand processing circuits in accordance with one of the computer instructions to produce resultants wherein the operand processing circuits operate independently and a plurality of the operand processing circuits function concurrently. Upon completion of the processing of the operands, the resultants are transferred from the operand processing circuits at the rate of one resultant per clock cycle to an output bus during a plurality of sequential clock cycles. As a result of the concurrent execution, the processing rate is substantially increased while the transfer rate of operands through the input and output buses is maintained at an optimum rate for interfacing with memory, caches, and I/O devices.

In a further aspect of the present invention, the plurality of operand processing circuits are assigned priorities. The operands from the input bus are loaded into the highest priority operand processing circuit which is not busy processing operands previously received. The operand processing circuits are allocated by means of distributed self control.

DETAILED DESCRIPTION OF THE DRAWINGS

Figure 1:
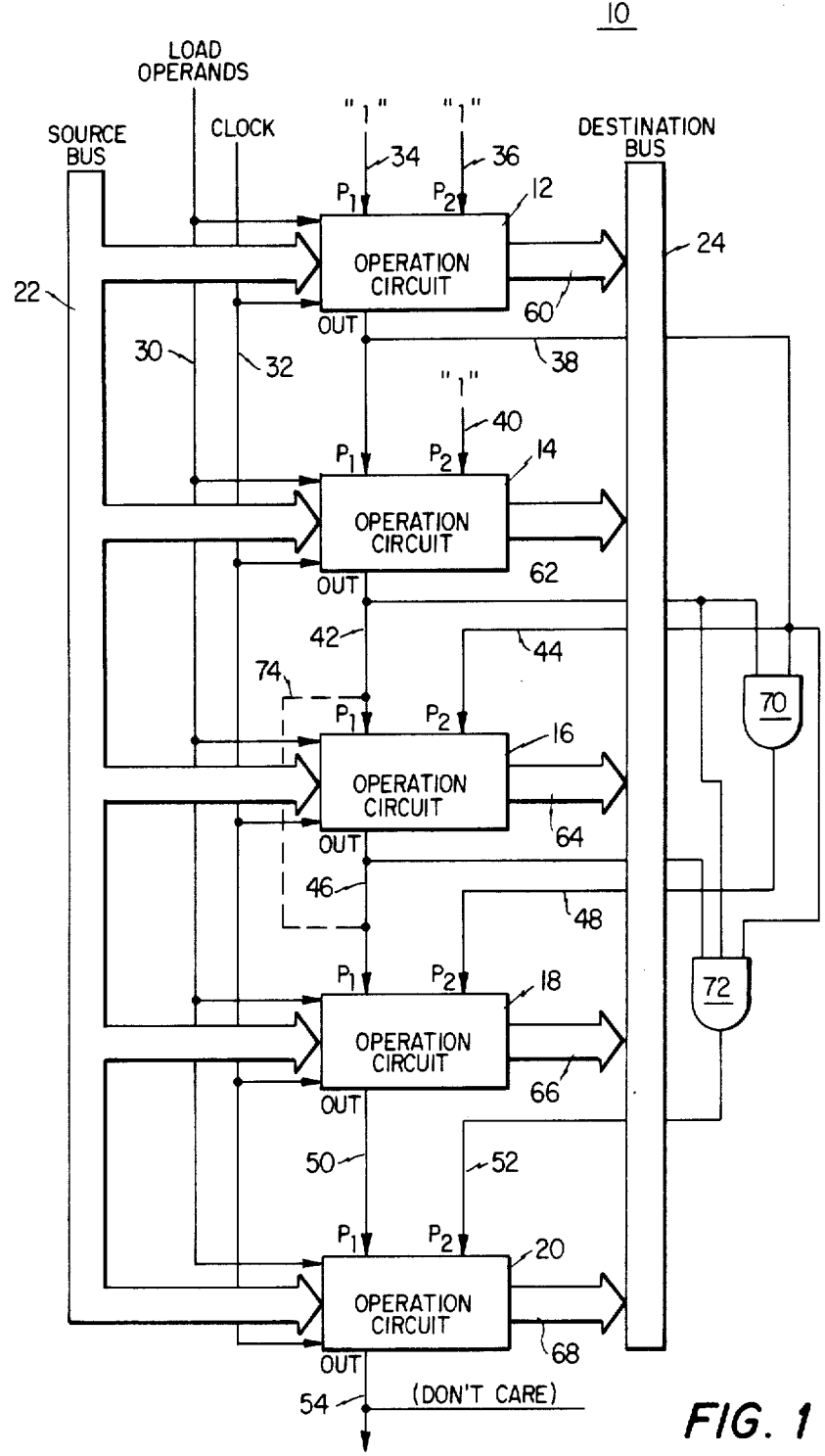
Figure 2:
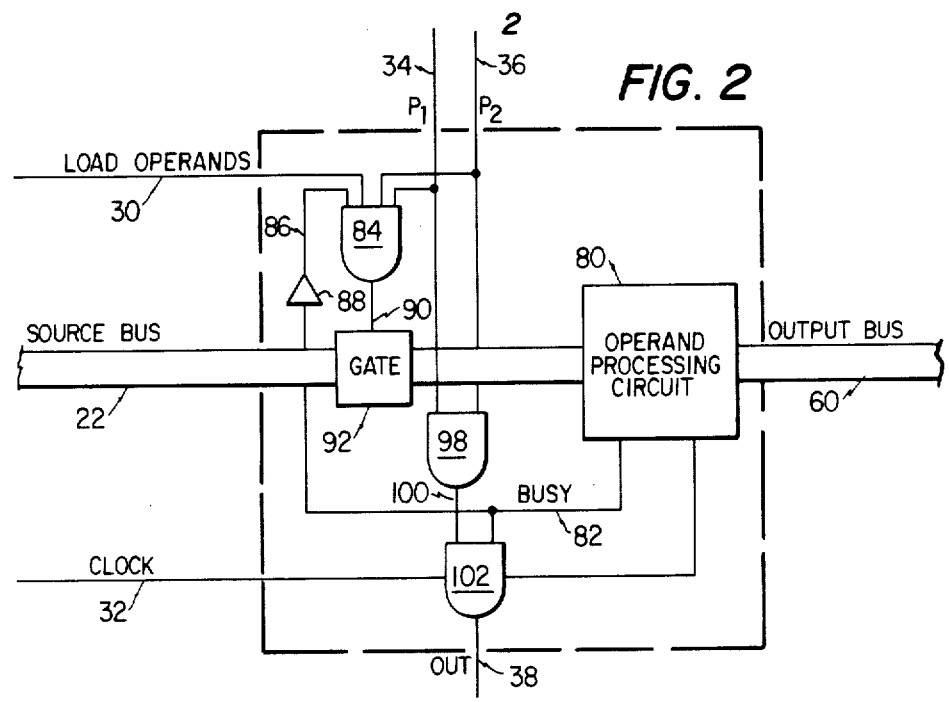
Figure 3:
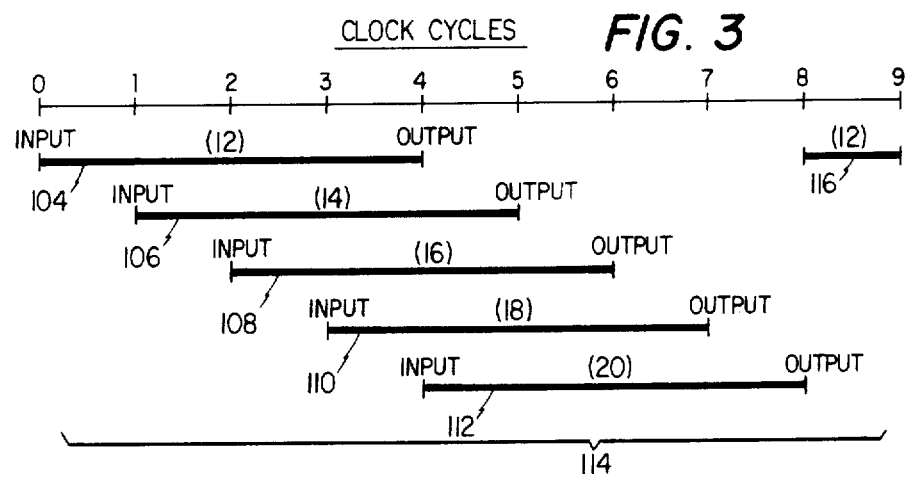
Figure 4:
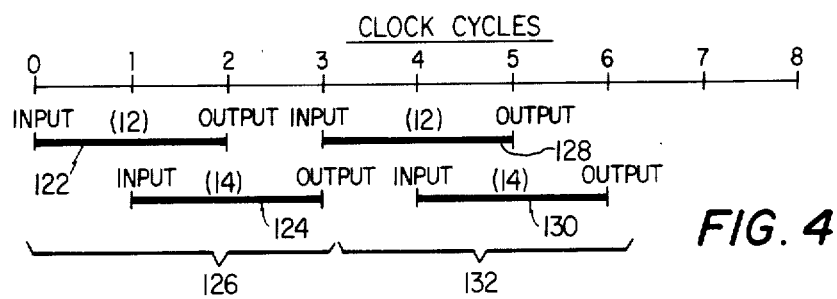

For a more complete understanding of the present invention and the advantages thereof, reference is now made to the following description taken in conjunction with the accompanying drawings in which:

FIG. 1 is a block diagram of a plurality of operation circuits together with sequencing circuitry in accordance with the present invention, FIG. 2 is a schematic illustration of one of the operation circuits shown in FIG. 1, FIG. 3 is a timing diagram illustrating the operand flow and instruction processing sequences for the circuit shown in FIG. 1 utilizing all the available operation circuits, and FIG. 4 is a timing diagram illustrating the input and output of operands and the sequencing of processing for the circuit shown in FIG. 1 using less than all of the available operation circuits.

DETAILED DESCRIPTION OF THE INVENTION

The present invention comprises a portion of a computer which is utilized for processing wherein operands are supplied to the processing circuitry and resultants are returned from it. Referring now to FIG. 1, there is illustrated an operand processing unit which is designated by the reference numeral 10. The unit 10 includes five identical operation circuits 12, 14, 16, 18 and 20. Each of these circuits has two priority inputs which are labeled $P_1$ and $P_2$. Each circuit further has an output which is labeled OUT. Five operation circuits are shown in the unit 10; however, any number may be used as long as there are at least two such circuits.

A source bus 22, also known as an input bus, receives operands and is connected to supply the operands to each of the operation circuits 12, 14, 16, 18 and 20. The operands can be received from other units within a computer (not shown) such as caches, main memory and input/output devices. The operation circuits 12, 14, 16, 18 and 20 each function to produce resultants which are then transmitted to a destination bus 24 for return to other computer elements, as noted above, such as caches, main memory and input/output devices. The buses 22 and 24, in a selected embodiment, are 64 bits wide. However, operands can be supplied and resultants returned from the operation circuits 12, 14, 16, 18 and 20 in any manner, including serial.

The operation circuits 12, 14, 16, 18 and 20 by virtue of their relative positions have descending priorities in the order 12, 14, 16, 18 and 20.

A command "LOAD OPERANDS" is transmitted through a line 30 to each of the operation circuits 12, 14, 16, 18 and 20. When the command "LOAD OPERANDS" is in an active state, it signals the operation circuits 12, 14, 16, 18 and 20 that an operand is available on the source bus 22 and is ready to be loaded into one of the operation circuits.

The operand processing unit 10, as well as the operation circuits 12, 14, 16, 18 and 20, operate synchronously in response to clock cycle signals which are transmitted through a clock line 32.

The $P_1$ and $P_2$ inputs of the operation circuit 12 both receive logic "1" signals through lines 34 and 36. The OUT terminal of circuit 12 is connected to a line 38 which is in turn connected to the $P_1$ terminal of circuit 14. The $P_2$ terminal of circuit 14 is connected to receive a logic "1" through a line 40. The OUT terminal of circuit 14 is connected to a line 42 that is connected to the $P_1$ terminal of circuit 16. The $P_2$ terminal of circuit 16 receives signals via a line 44. The OUT terminal of circuit 16 is connected to a line 46 which is further connected to the $P_1$ terminal of circuit 18. The $P_2$ terminal of circuit 18 receives input signals from a line 48. The OUT terminal of circuit 18 is connected through a line 50 to the $P_1$ terminal of the circuit 20. The $P_2$ terminal of circuit 20 receives input signals through a line 52. The OUT terminal of circuit 20 is connected to a line 54. The output of the OUT terminal of the last in the series of operation circuits is a "don't care."

The operation circuits 12, 14, 16, 18 and 20 have respective resultant output buses 60, 62, 64, 66 and 68 which are connected to transfer resultants to the destination bus 24.

The sequencing of the loading of operands from the source bus into the operation circuits 12, 14, 16, 18 and 20, as well as the allocation of priorities for these circuits, is determined by logic within the circuits which operates in conjunction with logic external to the operation circuits. This external logic includes an AND gate 70 which has the two inputs thereof connected, respectively, to lines 38 and 42. The output of gate 70 is connected to line 48. A second AND gate 72 has a first input connected to line 38, a second input connected to line 42 and a third input connected to line 46. The output of gate 72 is connected to line 52.

If there are included more than five operation circuits in the unit 10, there are provided additional AND gates to expand the external control logic which is shown as AND gates 70 and 72.

An optional jumper 74 can be installed between lines 42 and 46. Operation circuit 16 is bypassed when jumper 74 is installed and circuit 16 is physically removed. Each of the remaining operation circuits 12, 14, 18 and 20 can be similarly bypassed by the installation of a jumper corresponding to jumper 74.

The operation circuits 12, 14, 16, 18 and 20 shown in FIG. 1 are identical. The operation circuit 12 is illustrated as a functional schematic diagram in FIG. 2. The circuit 12 includes an operand processing circuit 80 which serves the purpose of processing for operands provided thereto. These operations include, for example, multiplication, division, addition, subtraction, logical AND, and shifts. The design of logical circuits to perform these functions is well known in the art and is described in the book by Lorin noted above. When the circuit 80 is actively processing operands, a BUSY signal, having a logic state "1", is generated at a line 82.

An AND gate 84 has a first input connected to the $P_1$ terminal of circuit 12, a second input connected to the $P_2$ terminal of circuit 12, a third input connected to the LOAD OPERANDS line 30 and a fourth input connected to a line 86. An inverter 88 has its input connected to line 82 and its output connected to line 86. The output of gate 84 is transmitted through a line 90 to operate a gate 92 which controls the transmission of operands from the source bus 22 to the operand processing circuit 80.

The terminals $P_1$ and $P_2$ are further connected as respective inputs to an AND gate 98. The output of gate 98 is transmitted through a line 100 to the first input of an AND gate 102. The BUSY line 82 provides the second input to the AND gate 102. The output of gate 102 is connected to the OUT terminal of circuit 12.

FIG. 3 illustrates the time sequence of loading operands into the operation circuits 12, 14 16, 18 and 20, the processing of the operands within these circuits and the transfer of the resultants from these circuits to the destination bus 24. The timing sequence for the operation of the operation circuits 12, 14, 16, 18 and 20 is indicated, respectively, by the lines 104, 106, 108, 110 and 112. A complete processing cycle is indicated by the reference numeral 114. The start of the second processing cycle is indicated by a line 116 which corresponds to the operation circuit 12. The sequence illustrated in FIG. 3 utilizes all of the operation circuits 12, 14, 16, 18 and 20 within the operand processing unit 10.

The timing sequence shown in FIG. 4 illustrates the processing of operands utilizing only the operation circuits 12 and 14. In FIG. 4 the processing time for operation circuits 12 and 14 is shown by the respective lines 122 and 124 within a processing cycle 126. Subsequent processing times for the operation circuits 12 and 14 are shown by respective lines 128 and 130 within a processing cycle 132.

The operation of the operand processing unit 10 is now described in reference to FIGS. 1, 2, 3 and 4. An operand as used herein comprises either a single or a plurality of elements. Each element typically constitutes a data unit such a number. For the example described herein, each operand comprises two data elements which are functionally processed. It is assumed for the described example that the operation circuits 12, 14, 16, 18 and 20 perform the operation of multiply. Thus, the function of each operation circuit is to receive two data elements, perform a multiply and produce a resultant product. For this example each data element comprises a 32 bit word and the two words are transmitted in parallel through the source bus 22 during one clock cycle.

Whenever an operand is available on the source bus 22, the signal LOAD OPERANDS at line 30 goes to a positive state, namely a logic "1". When such an operand is available to be loaded into one of the operation circuits 12, 14, 16, 18 and 20, it is loaded into the circuit which has the highest priority and is not busy. This sequence of loading is controlled by logic which is within each of the operation circuits 12, 14, 16, 18 and 20, as well as including the AND gates 70 and 72.

Operation of the logic within the operation circuit 12 is shown in reference to FIG. 2. Note that the operation of the remaining operation circuits 14, 16, 18 and 20 is the same as that described for circuit 12. When a logic "1" state is received at the $P_1$ terminal, the $P_2$ terminal, line 30, and line 86, the output of AND gate 84 is driven to a positive state which activates the gate 92 to pass the operand from source bus 22 into the operand processing circuit 80. When the circuit 80 becomes busy, the line 82 is driven to a logic "1" state thereby driving line 86 to a logic "0" state which changes the output of the gate 84, thereby deactivating the gate 92 to prevent any loading of operands into the circuit 80 as long as the circuit 80 remains busy. For the circuit 12, the inputs $P_1$ and $P_2$ will always be a logic "1" state but such is not the case for the remaining operation circuits 14, 16, 18 and 20.

The circuit 12 further includes the AND gate 98 which produces a logic "1" output when both the $P_1$ and $P_2$ terminals are at a logic "1" state. The output of the gate 98 is ANDed in the gate 102 with the BUSY signal at line 82. Thus, the OUT terminal of the circuit 12 is driven to a logic "1" state only when the operand processing circuit 80 is busy and the priority terminals $P_1$ and $P_2$ are at a logic "1" state.

The input terminals of the AND gate 70 are connected to the OUT terminals of circuits 12 and 14 and provide the $P_2$ input to the circuit 18. The AND gate 72 receives inputs from the OUT terminals of circuits 12, 14 and 16 and provides the $P_2$ input to circuit 20.

As a result of the logical operation of the AND gates 70 and 72 and the internal gates 98 and 102 within each of the circuits 12, 14, 16, 18 and 20, there is priority and sequencing of the loading of operands into the circuits 12, 14, 16, 18 and 20. The result is that a higher numbered operation circuit cannot receive an operand until all of the lower numbered circuits are busy processing operands. For example, circuit 18 will not receive an operand for processing until all of the circuits 12, 14 and 16 are busy.

The timing of the processing of the operands is shown in FIGS. 3 and 4. As noted above, the unit 10 operates synchronously at uniform clock cycles. As a result of this synchronous operation, only one operand is transmitted per clock cycle through the source bus 22 and only one resultant is transmitted per clock cycle through the destination bus 24. Since the sources of operands and destinations of the resultants typically produce and store operands at the rate of one per clock cycle, the unit 10 is optimally adapted to interface with such units while providing fast parallel processing of instructions that require more than one cycle for execution.

Referring now to FIG. 3, there is illustrated the concurrent processing of an instruction which requires four clock cycles for execution for each operand. A first operand is input at the start of clock cycle 0 into circuit 12. This is indicated by line 104. The resultant produced by circuit 12 is transmitted to the destination bus 24 at the start of clock cycle 4. Similar operations occur for each of the circuits 14, 16, 18 and 20 at one cycle increments as indicated by the lines 106, 108, 110 and 112. The last resultant is produced at the start of the eighth clock cycle. The complete processing of the five operands is indicated by the processing cycle 114. It can thus be seen that the five resultants are produced as a result of concurrent processing during eight clock cycles. If the five processing operations were carried out serially using one logical operation circuit, such as circuit 12, the complete processing would require 20 clock cycles. It can therefore be seen that the processing technique of the present invention provides a saving of 12 clock cycles for the described example.

For the above example, the instruction being executed requires n clock cycles. The operands are input to a selected operation circuit and the resultant is produced n cycles later. Typically the same instruction is executed in each operation circuit during a processing cycle, such as 114.

The priority of allocation of the operation circuits 12, 14, 16, 18 and 20 can further be observed in reference to FIG. 3. Note that as the operands are received through the source bus 22, they are input to the highest priority operation circuit which is not busy. When the sixth operand is received, it is allocated to the operation circuit 12 which is no longer busy since it produced its resultant at the start of the fourth clock cycle.

A further example of sequencing and priority is shown in reference to FIG. 4. In this example the instruction being executed requires only two clock cycles. The first operand received through the source bus 22 is input into the operation circuit 12 at the start of clock cycle 0 as indicated by line 122. The next operand, which is received during the immediate succeeding clock cycle, is input to the operation circuit 14 at the start of the clock cycle 1. The second operand is allocated to the operation circuit 14 since the operation circuit 12 is busy. The circuit 12 produces its resultant at the start of clock cycle 2 thereby freeing the circuit 12. The next operand is received at the start of clock cycle 3 and it is input to the operation circuit 12 which is the highest priority circuit that is not busy. The circuit 14 also outputs its resultant at the start of clock cycle 3. The next resultant received at clock cycle 4 is input to the operation circuit 14 which at that time is the highest priority operation circuit available that is not busy. The circuit 12 produces its second resultant at the start of clock cycle 5 and the circuit 14 produces its resultant at the start of clock cycle 6. This procedure repeats for so long as a two cycle instruction is being executed.

A further advantage of the present invention is the ability of the operand processing unit 10 to continue operation despite the failure of one of the operation circuits. A jumper can be provided to bypass any one of the operation circuits 12, 14, 16, 18 and 20 by connecting the $P_1$ terminal to the $P_1$ terminal of the succeeding operation circuit. The operation circuit 16 must be physically removed from the operand processing unit 10. For example, assume that the circuit 16 has failed. The jumper 74 is installed to connect the $P_1$ terminal at line 42 to the $P_1$ terminal at line 46. When the jumper 74 is installed and circuit 16 removed, the failure of circuit 16 does not stop the operation of the operand processing unit 10. The priority of the group of operation circuits is then 12, 14, 18 and 20. Thus, for example, an instruction that would require the use of 3 of the operation circuits would result in the utilization sequence as follows: 12, 14, 18, 12, 14, 18. . . . In this way the operand processing unit 10 can continue operation despite the loss of one of the operation circuits therein.

In the case where all five of the operation circuits 12, 14, 16, 18 and 20 are required for continuous processing of an instruction, such as shown in FIG. 3, there will be a degradation in the processing speed for the operands since there must be a pause between each processing cycle to allow one of the operation circuits to complete the processing of its operands. Thus, the operation of the overall unit 10 can continue despite the loss of one, or even more than one, operation circuits. In most applications it is preferable to continue operating at a reduced speed in the event of a failure rather than suffering a complete loss of processing.

A further advantage of the present invention is the reduction in design and manufacturing expenses since the operation circuits 12, 14, 16, 18 and 20 are identical and interchangeable. This further simplifies maintenance and reduces the supply of spares required for repair.

A preferred method for the production of the operation circuits 12, 14, 16, 18 and 20 is the use of gate arrays. Within a complete computer the unit 10 can be implemented as a plurality of units to provide a plurality of functions for the processing of operands.

In summary, the present invention provides a method and apparatus for concurrent operand processing which is uniquely adapted to interface with operand sources and destinations which transmit and receive operands at the rate of one per clock cycle.

Although one embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the scope of the invention.

We claim:

1. A method for concurrent processing of operands in a computer wherein instructions for processing the operands require a plurality of computer clock cycles for execution, comprising the steps of:
   transferring an operand per clock cycle through an input bus during a plurality of sequential clock cycles,
   loading a plurality of operands at the rate of one operand per clock cycle through said input bus directly into each of a plurality of functionality similar operand processing circuits which have the inputs thereof connected in parallel during a plurality of sequential clock cycles,
   processing said operands within said operand processing circuits in accordance with one of said computer instructions to produce resultants wherein said operand processing circuits operate independently and a plurality of said operand processing circuits function concurrently, and
   transferring one of said resultants per clock cycle from said operand processing circuits to an output bus during a plurality of sequential clock cycles.

2. The method as recited in claim 1 wherein the step of transferring an operand comprises the step of transferring through said input bus an operand comprising first and second data elements during each of the plurality of sequential clock cycles.

3. The method as recited in claim 1 wherein the step of loading a plurality of operands at the rate of one operand per clock cycle comprises loading said operands into said operand processing circuits wherein said operand processing circuits have a predetermined order of priority usage and each operand is loaded into the highest priority usage operand processing circuit which is not busy at the time the operand to be loaded is transferred through the input bus.

4. The method as recited in claim 1 wherein said step of processing said operands comprises the operation of multiplication.

5. The method as recited in claim 1 wherein said step of processing said operands comprises the operation of division.

6. The method as recited in claim 1 wherein said step of processing said operands comprises the operation of addition.

7. The method as recited in claim 1 wherein said step of processing said operands comprises the operation of shifting.

8. The method as recited in claim 1 wherein each of said operand processing circuits functions in response to the same computer instruction.

9. A method for the concurrent processing of operands in a computer having a selected clock cycle wherein instructions for processing the operands require a plurality of clock cycles for execution comprising the steps of:
   transferring operands through an input bus,
   loading said operands into operand processing circuits through said input bus directly into said operand processing circuits which have the inputs thereof connected in parallel, each of said operands being loaded into a separate operand processing circuit, said circuits having similar functionality and assigned relative priorities of usage wherein each said operand is loaded into the highest priority of usage circuit which is not busy processing operands,
   processing said operands within said operand processing circuits in accordance with one of said instructions to produce resultants wherein said operand processing operate independently and a plurality of said operand processing circuits function concurrently, and
   transferring said resultants produced by said operand processing circuits to an output bus.

10. The method recited in claim 9 wherein the step of transferring operands comprises transferring one operand through said input bus per clock cycle.

11. The method recited in claim 9 wherein the step of transferring said resultants comprises transferring one resultant per clock cycle to said output bus.

12. The method recited in claim 9 wherein said step of processing said operands comprises the operation of multiplication.

13. The method recited in claim 9 wherein said step of processing said operands comprises the logical operation of division.

14. The method recited in claim 9 wherein said step of processing said operands comprises the logical operation of addition.

15. The method recited in claim 9 wherein said step of processing said operands comprises the operation of shifting.

16. The method recited in claim 9 wherein the an operand comprising step of transferring operands comprises transferring first and second data elements during each of the plurality of sequential clock cycles.

17. A method for concurrent processing of operands in a computer wherein instructions for processing the operands require a plurality of computer clock cycles for execution, comprising the steps of:
   conveying a first pair of data elements through an input bus during a first clock cycle,
   loading said first pair of data elements from said input bus into a first operand processing circuit during said first clock cycle,
   initiating processing of said first pair of data elements in said first operand processing circuit in accordance with one of said instructions for producing a first resultant, said processing in said first operand processing circuit requiring n clock cycles, conveying a second pair of data elements through said input bus during a second clock cycle immediately following said first clock cycle, loading said second pair of data elements from said input bus into a second operand processing circuit during said second clock cycle, initiating processing of said second pair of data elements in said second operand processing circuit in accordance with one of said instructions for producing a second resultant, said processing in said second operand processing circuit requiring n clock cycles, wherein at least a part of the processing in said first operand processing circuit is concurrent with the processing in said second operand processing circuit, transferring said first resultant from said first operand processing circuit to an output bus during a clock cycle n cycles subsequent to said first clock cycle, and transferring said second resultant from said second operand processing circuit to said output bus during a clock cycle n cycles subsequent to said second clock cycle.

18. Apparatus for use within a computer to provide concurrent processing of operands wherein each instruction for processing the operands requires a plurality of computer clock cycles for execution, comprising:

a plurality of independent functionally similar operand processing circuits, each of said circuits for processing operands supplied thereto in accordance with at least one of said instructions, an input bus connected in parallel to the inputs of said operand processing circuits for loading operands into said operand processing circuits, an output bus connected in parallel to the outputs of said operand processing circuits for receiving resultants produced by said operand processing circuits, and means for loading said operands from said input bus to said operand processing circuits at the rate of one operand per clock cycle wherein at least two of said operand processing circuits function concurrently to process the operands supplied thereto.

19. The apparatus recited in claim 18 wherein said means for loading includes means for supplying a clock signal to said operand processing circuits to clock said circuits for functioning synchronously.

20. The apparatus recited in claim 18 wherein said operand processing circuits are multiplication circuits.

21. The apparatus recited in claim 18 wherein said operand processing circuits are division circuits.

22. The apparatus recited in claim 18 wherein said operand processing circuits are addition circuits.

23. The apparatus recited in claim 18 wherein said operand processing circuits are shift circuits.

24. Apparatus for use in a computer to provide concurrent processing of operands wherein each instruction for processing the operands requires a plurality of computer clock cycles for execution, comprising:

a plurality of independent functionally similar operand processing circuits for processing operands supplied thereto in accordance with at least one of said instructions, said operand processing circuits having predetermined relative priorities of usage for receiving operands, an input bus connected in parallel to the inputs of said operand processing circuits for supplying operands to said operand processing circuits, an output bus connected in parallel to the outputs of said operand processing circuits for receiving resultants produced by said operand processing circuits, and means for selectively loading said operands into said operand processing circuits in an order such that each of said operands is loaded into the highest priority of usage operand processing circuit which is not busy processing operands previously received therein, wherein at least two of said operand processing circuits function concurrently to process said operands.

25. Apparatus recited in claim 24 wherein said input bus conveys therethrough only one operand per clock cycle and said output bus conveys therethrough only one resultant per clock cycle.

26. Apparatus as recited in claim 24 wherein said operand processing circuits are multiplier circuits.

27. Apparatus as recited in claim 24 wherein said operand processing circuits are division circuits.

28. Apparatus as recited in claim 24 wherein said operand processing circuits are addition circuits.

29. Apparatus as recited in claim 24 wherein said operand processing circuits are shift circuits.

* * * * *

UNITED STATES PATENT AND TRADEMARK OFFICE
CERTIFICATE OF CORRECTION

PATENT NO. : 4,809,171
DATED : February 28, 1989
INVENTOR(S) : Dozier, et al.

It is certified that error appears in the above-identified patent and that said Letters Patent is hereby corrected as shown below:

Col. 4, line 42, immediately following the word "such", please insert the word -- as --.

Col. 7, line 36, please delete the word "functionality" and substitute therefor the word -- functionally --.

Col. 8, lines 7, 8 and 9, please delete Claim 8 in its entirety.

Col. 8, lines 53 and 54, please delete the phrase "an operand comprising".

Signed and Sealed this

Fifteenth Day of June, 1993

Attest:

MICHAEL K. KIRK

Attesting Officer

Acting Commissioner of Patents and Trademarks